(12) United States Patent
Schlüter et al.

(10) Patent No.: US 9,073,523 B2
(45) Date of Patent: Jul. 7, 2015

(54) MASTER CYLINDER SYSTEM FOR AN AUTOMOTIVE HYDRAULIC BRAKE SYSTEM AND AUTOMOTIVE HYDRAULIC BRAKE SYSTEM

(75) Inventors: Peter Schlüter, Kammerforst (DE); Monika Matthei, Waldesch (DE)

(73) Assignee: Lucas Automotive GmbH, Koblenz (DE)

( * ) Notice: Subject to any disclaimer, the term of this patent is extended or adjusted under 35 U.S.C. 154(b) by 1663 days.

(21) Appl. No.: 11/990,168

(22) PCT Filed: Jul. 25, 2006

(86) PCT No.: PCT/EP2006/007328
§ 371 (c)(1),
(2), (4) Date: Mar. 17, 2010

(87) PCT Pub. No.: WO2007/017100
PCT Pub. Date: Feb. 15, 2007

(65) Prior Publication Data
US 2010/0164276 A1 Jul. 1, 2010

(30) Foreign Application Priority Data
Aug. 10, 2005 (DE) .......................... 10 2005 037 792

(51) Int. Cl.
| | | |
|---|---|---|
| B60T 11/00 | (2006.01) | |
| B60T 7/04 | (2006.01) | |
| B60T 8/26 | (2006.01) | |
| B60T 8/40 | (2006.01) | |
| B60T 8/44 | (2006.01) | |
| B60T 11/20 | (2006.01) | |
| B60T 13/74 | (2006.01) | |

(52) U.S. Cl.
CPC .............. *B60T 7/042* (2013.01); *B60T 2230/00* (2013.01); *B60T 2270/40* (2013.01); *B60T 8/267* (2013.01); *B60T 8/4072* (2013.01); *B60T 8/4077* (2013.01); *B60T 8/441* (2013.01); *B60T 11/203* (2013.01)

(58) Field of Classification Search
CPC ............... B60T 7/12; B60T 8/17; B60T 8/88; B60T 8/885; B60T 8/171; B60T 13/00; B60T 13/588; B60T 13/02; B60T 13/12; B60T 13/161; B60T 13/168; B60T 13/66; B60T 17/18; B60T 17/22; B60T 17/222; B60T 17/223; B60T 2230/00; B60T 2270/40
USPC .......... 303/113.4, 114.2, 115.1, 113.1, 116.2, 303/122; 188/345, 151 R; 60/562, 582
See application file for complete search history.

(56) References Cited

U.S. PATENT DOCUMENTS 3,387,850 A * 6/1968 Mastrobattista et al. ....... 29/445
3,870,377 A * 3/1975 Belart et al. ................ 303/114.2
(Continued)

FOREIGN PATENT DOCUMENTS

| DE | 37 15 209 A1 | 4/1988 |
|---|---|---|
| DE | 694 00 527 T2 | 1/1997 |
| WO | WO 94/20346 | 9/1994 |

*Primary Examiner* — Melody Burch
(74) *Attorney, Agent, or Firm* — MacMillan, Sobanski & Todd, LLC (57) ABSTRACT

The present invention relates to a master cylinder arrangement for a motor vehicle hydraulic brake system comprising a housing, in which two adjacent cylinder bores are provided, two piston arrangements, wherein a first piston arrangement is received in a first of the cylinder bores so as to be displaceable along a first bore longitudinal axis and wherein a second piston arrangement is received in a second of the cylinder bores so as to be displaceable along a second bore longitudinal axis, a force input piston, which is connectable or connected to a brake pedal, wherein in accordance with a movement of the force input piston the first piston arrangement and the second piston arrangement are displaceable, wherein the first piston arrangement with the housing delimits a first pressure chamber, which is fluidically connected to a hydraulic brake system, and wherein the second piston arrangement with the housing delimits a second pressure chamber, which is fluidically connected to the hydraulic brake system. In this master cylinder arrangement it is provided that between the first piston arrangement as well as the second piston arrangement and the force input piston a separate transmission element is disposed, which is movable into joint abutment with the first piston arrangement and the second piston arrangement.

26 Claims, 5 Drawing Sheets

(56) References Cited

U.S. PATENT DOCUMENTS

| | | | |
|---|---|---|---|
| 4,464,899 A * | 8/1984 | Myers et al. | 60/547.1 |
| 4,489,989 A | 12/1984 | Belart et al. | |
| 4,604,870 A * | 8/1986 | Bach et al. | 60/551 |
| 4,794,757 A | 1/1989 | Schlüter | |
| 5,098,171 A * | 3/1992 | Siegel | 303/113.4 |
| 5,234,086 A * | 8/1993 | Matsuda et al. | 188/358 |
| 5,448,888 A * | 9/1995 | Castel | 60/580 |
| 6,871,916 B2 * | 3/2005 | Stephane et al. | 303/113.4 |
| 7,823,984 B2 * | 11/2010 | Schluter | 303/114.1 |
| 2005/0121974 A1 * | 6/2005 | Buschmann | 303/122.09 |

\* cited by examiner

MASTER CYLINDER SYSTEM FOR AN AUTOMOTIVE HYDRAULIC BRAKE SYSTEM AND AUTOMOTIVE HYDRAULIC BRAKE SYSTEM

CROSS-REFERENCE TO RELATED APPLICATIONS

This application is a National Stage of International Application No. PCT/EP2006/007328 filed Jul. 25, 2006, the disclosures of which are incorporated herein by reference, and which claimed priority to German Patent Application No. 10 2005 037 792.0 filed Aug. 10, 2005, the disclosures of which are incorporated herein by reference.

BACKGROUND OF THE INVENTION

The present invention relates to a master cylinder arrangement according to the preamble of claim 1.

Such a master cylinder arrangement is known for example from the document DE 37 15 209 A1, and corresponding U.S. Pat. No. 4,794,757, both of which are incorporated by reference herein. This is designed in a similar manner to a tandem master cylinder arrangement but is much more space-saving because the two piston arrangements act in the mutually adjacent cylinder bores, which are hydraulically connected to one another. During a braking operation, a brake pedal is used to introduce into the first piston a pedal actuating force, by means of which the brake pressure is then generated in the hydraulic brake system. In other words, in a brake system equipped with this master cylinder arrangement the hydraulic brake pressure needed to load the wheel brake of the vehicle is generated exclusively by the master cylinder arrangement.

The disadvantageous effect of such a directly connected brake system is that the driver by means of his actuating activity at the brake pedal always influences the hydraulic pressure at the wheel brakes. So long as this assists the braking situation, it is not a problem. However, as soon as the driver reacts incorrectly to the actual braking situation by adjusting for example far too much or far too little brake pressure, the braking performance, in particular the braking distance and the track-keeping of the vehicle may be impaired, which in the worst-case scenario may lead to an accident.

A further drawback of this arrangement is that the two piston arrangements in the corresponding cylinder bores are hydraulically connected to one another. This gives rise to the problem that in the event of a malfunction, in particular a leakage in the region of the piston arrangement moved directly by a brake pedal actuation, reliable activation of the piston arrangement disposed downstream of this piston arrangement is no longer possible.

In DE 694 00 527 T2, and corresponding U.S. Pat. No. 5,448,888, both of which are incorporated by reference herein, a master cylinder for a brake system is disclosed, which comprises a parallel arrangement of first and second pressure chambers, which are connected to brake circuits. The master cylinder further comprises a third chamber, which is connected to a brake actuating device and receives a third piston, which during normal operation transmits some of the input force via a liquid column to first and second pistons disposed in the first and second pressure chambers. There is therefore a direct mechanical connection of force input element and hydraulic brake system, with the previously described drawbacks. For an emergency operating situation as a result of leakages, it is provided that a compensating fork, which abuts the first and second pistons and may be displaced by the third piston, is used for force transmission.

BRIEF SUMMARY OF THE INVENTION

The object of the present invention is to provide a master cylinder arrangement and a correspondingly designed motor vehicle brake system of the previously described type, which are suitable for brake force boosting and which guarantee a more reliable mode of operation.

This object is achieved by a master cylinder arrangement of the initially described type that moreover has the features outlined in the characterizing portion of claim 1.

According to the invention it is therefore provided that the two piston arrangements are mechanically connectable to the force input piston only in the emergency operating situation, and namely by means of the transmission element. Thus, in the event of a leakage in one of the hydraulic systems associated with the piston arrangements, at least the respective other hydraulic system may be activated directly by means of the force input piston. The hydraulic actuation of the one piston arrangement by means of the hydraulic system associated with the respective other piston arrangement in this case no longer applies.

A development of the invention provides that the adjacent cylinder bores extend substantially parallel to one another. A space-saving arrangement of the inder bores is therefore possible.

According to the invention, it may further be provided that the first and second piston arrangements are biased in each case by means of piston-resetting springs into a normal position in the direction of the transmission element. It may moreover be provided that the force input piston is biased into a normal position by means of a pedal-resetting spring. The pedal-resetting spring in this case may be disposed integrated in the housing or supported against a housing end.

In contrast to the initially discussed prior art, in which an actuation of the first piston arrangement is effected directly by means of the brake pedal, a development of the invention provides that in the normal operating situation the master cylinder arrangement according to the invention is actuated, not directly by means of a pedal actuation, but instead by means of an intermediate servo system in accordance with a pedal actuation and a resultant movement of the force input piston. Thus, this constructional variant of the invention provides that each piston arrangement comprises a pressure piston and a back-up piston, wherein enclosed between the respective pressure piston and the respective back-up piston is a servo chamber, which is chargeable with a pressure fluid from a pressure source. In this case, the back-up piston upon introduction of the pressure fluid into the servo chambers remains in a normal position, whereas the respective pressure piston is displaced in a brake-active manner. In this connection, it may further be provided that the servo chambers associated with the first piston arrangement and the second piston arrangement are jointly chargeable with pressure fluid for the brake-active increase of the fluid pressure in the first pressure chamber and in the second pressure chamber. The effect may therefore be achieved that both piston arrangements are activated with the same intensity, thereby resulting in a uniform braking performance. This is necessary particularly when there is also a wheel brake unit of a brake system associated in each case with a pressure chamber.

A development of the invention provides that the force input piston is received displaceably in a cylindrical receiving bore and with the housing encloses a pedal-counterforce pressure chamber. In this connection, it may be provided that the pedal-counterforce pressure chamber is connectable to a hydraulic pedal-counterforce simulation device. In this case, the pedal-counterforce simulation device may be disposed in any desired manner, in particular at a location where there is sufficient installation space available in the motor vehicle. In this connection, from a design viewpoint it may further be provided that the force input piston is connected to a contact plunger, which is received in a cylindrical connection bore aligned with the receiving bore and, as a result of a displacement of the force input piston, after overcoming a play is mechanically connectable to the transmission element.

The provision of such a play makes it possible for the force input piston and hence the brake pedal to be mechanically uncoupled from the piston arrangements. This measure is to be understood in the context of the mechanically uncoupled actuation of the piston arrangement by the brake pedal that has already been discussed above. If a brake pedal actuation is detected by means of an electronic sensor device, about which more detail will be provided below, then by virtue of the provision of such a play it is guaranteed that, given a properly functioning servo circuit, a direct mechanical connection of brake pedal and piston arrangements will not occur. Instead, from the detected pedal actuation only the braking request of the driver is determined and in accordance with this determined braking request and taking respective vehicle operating parameters into consideration an appropriate brake force is generated by means of the servo pressure circuit. It is only if the servo circuit supply is not functioning properly that the play is overcome, thereby also allowing—in an emergency operating situation—a direct mechanical actuation of the piston arrangements to occur.

Preferably, according to the invention it is provided that the transmission element comprises a central receiving opening that receives the contact plunger with the play.

In this connection, it may further be provided that the play is dimensioned in such a way that a pedal actuation for regenerative braking in a hybrid vehicle occurs without a mechanical connection of force input piston and first piston arrangement. This means that also during a braking operation of a different type, for example when an electric motor disposed in a hybrid vehicle is utilized as a generator, wherein the generator mode deploys a deceleration effect that is sufficient for a slight braking of the vehicle, an undesirably premature mechanical connection between force input piston and piston arrangements is therefore avoided. In such a case of a purely regenerative braking operation, a charging of the servo chambers with pressure fluid also does not occur.

A development of the invention provides that the transmission element at its end facing the piston arrangements is of a cup-shaped design and receives in the cup a portion of the piston arrangements that faces towards it. The transmission element may therefore be of a longer design. This is necessary particularly if the transmission element is guided, preferably by means of at least two peripheral regions, in a linearly movable, tilt-proof manner in the housing. Given a correspondingly long design of the transmission element with suitable peripheral regions performing a guide function, a reliable take-up of axial forces as well as transverse forces is possible without any risk of tilting or binding of the transmission element.

As regards the manufacture of the master cylinder arrangement according to the invention, it should be stated that particularly because of the high piece numbers arising in motor vehicle manufacture the manufacturing costs are to be kept as low as possible. For this reason, according to the invention it may be provided that the housing is of a multipart design, wherein individual housing parts, particularly in the region of the piston arrangements, are connected in a fluidproof and detachable manner to one another. The individual housing parts are conceived in such a way that the bores, recesses and undercuts to be provided therein are as easy to produce as possible. For example, according to a constructional variant of the invention it is recommended that a housing part be designed in such a way that in it, without any need for undercuts that are expensive to produce, bores may be provided, which then in combination with the piston arrangements inserted therein form the pressure chambers. To facilitate assembly and for improved transmission of transverse forces, in the context of this inventive idea it may also be provided that housing parts, which are to be connected to one another, given a mutual connection are positioned in a setpoint position relative to one another in each case by means of a positioning element. It should also be mentioned that this inventive idea may be realized in addition to, or separately from, the previously described inventive idea.

With a view to simple and economical manufacture, a development of the invention provides that the piston arrangements are at least partially guided in guide bushes inserted into the housing. Because of the need to provide fluidproof guides for various components that are movable relative to one another, the respective surfaces, in particular the surfaces of receiving bores need to be of as high a quality and as insensitive as possible. This is costly above all in hollow bodies. With the previously mentioned variant the invention takes a different approach by using individual guide bushes, which are much easier to manufacture and may then be subsequently inserted into a housing blank and assume the required guide properties. In particular, in this connection it may be provided that the guide bushes are manufactured from corrosion-resistant and friction-reducing material.

Reference has already been made above to detection of the position of the force input piston for the purpose of detecting a pedal actuation. In this connection, a development of the invention provides that a movable component of a motion sensor is connected to the force input piston and that an immovable component of the motion sensor is provided on the housing. In this case, it may be provided that the movable component of the motion sensor is guided displaceably in the housing on a carrier piston that is movable with the force input piston. In an inventive continuation of this variant, it may also be provided that the movable component of the motion sensor is movably received close to or in an externally accessible guide well formed in the housing, wherein the guide well is sealingly closable by means of the immovable component of the motion sensor or by means of a structural part that receives the immovable component. It is therefore possible merely to remove the immovable component or the structural part that receives the immovable component in order to maintain or exchange the movable component of the motion sensor, should a defect make it necessary to repair or exchange the motion sensor. There is therefore no longer any need to dismantle the entire master cylinder arrangement, just the components of the motion sensor that would in any case have to be removed.

Furthermore, in the past it has been demonstrated time after time that the process of filling a master cylinder arrangement for the first time and after a repair or maintenance operation is time-consuming and hence cost-intensive. To counteract this problem, a development of the invention provides that a shut-off valve that opens pressure-dependently in the direction of a fluid reservoir is provided in the housing for filling the servo chamber, pressure chamber or/and further fluid chambers with hydraulic fluid. The effect may therefore be achieved that initially all of the chambers to be filled with hydraulic fluid are filled before, upon attainment of a predetermined minimum pressure, the shut-off valve automatically opens and an outflow into a fluid reservoir occurs.

The invention further relates to a motor vehicle brake system comprising a master cylinder arrangement of the previously described type, a pressure source, hydraulically activatable wheel brake units associated with individual wheels and an electronic control unit, wherein the pressure source is fluidically connectable to the wheel brake units and to the master cylinder arrangement in such a way that the pressure fluid supplied from the pressure source is usable on the one hand to charge the master cylinder arrangement, in particular the servo chambers thereof, and on the other hand to activate at least two wheel brake units.

In this motor vehicle brake system, it may be provided that the pressure source comprises a pump arrangement and an accumulator. According to the invention it may further be provided that the pedal-counterforce simulation device is disconnectable from the pedal-counterforce pressure chamber by means of a simulation-device on-off valve. As already indicated above, a development of the invention may provide that a generator usable to decelerate the vehicle is provided and that the vehicle deceleration achieved upon activation of the generator is taken into consideration when activating the motor vehicle brake system.

Other advantages of this invention will become apparent to those skilled in the art from the following detailed description of the preferred embodiments, when read in light of the accompanying drawings.

DETAILED DESCRIPTION OF THE INVENTION

Figure 1:
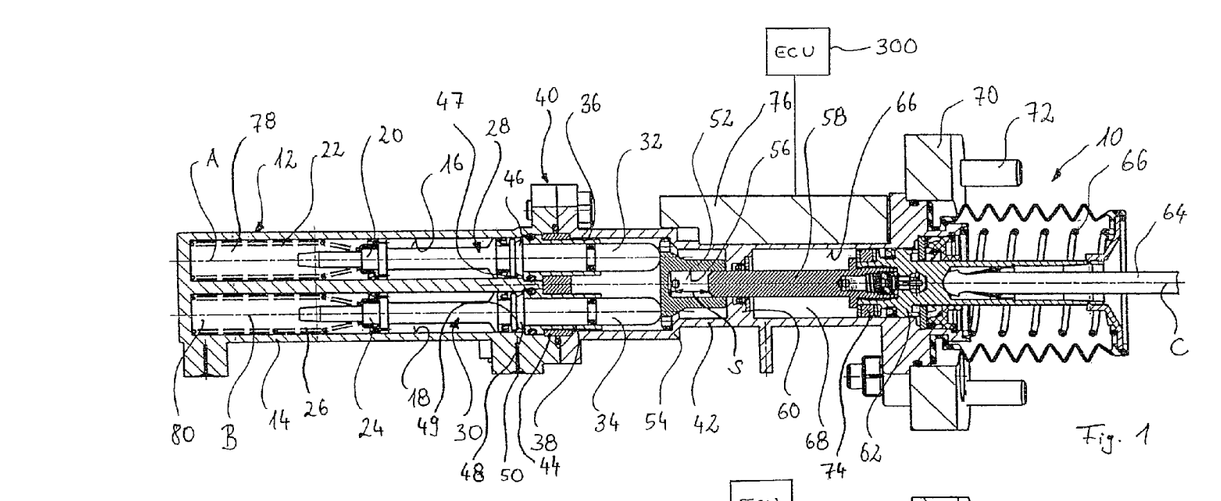
FIG. 1 is an axis-containing sectional view of a first constructional variant of the invention in non-actuated position.

In FIG. 1 a master cylinder arrangement according to the invention is shown in a longitudinal sectional view and denoted generally by 10. It comprises a housing 12 of a multipart design, of which a first housing part 14 has a first cylinder bore 16 and, parallel thereto, a second cylinder bore 18, which run parallel along a first bore longitudinal axis A and a second bore longitudinal axis B.

Disposed in the first cylinder bore 16 is a first pressure piston 20, which is biased in FIG. 1 to the right by means of a resetting spring 22. Analogously thereto, a second pressure piston 24 is disposed in the second cylinder bore 18 and biased in FIG. 1 to the right by means of a resetting spring 26.

The pressure pistons 20 and 24 are associated with respective first and second piston arrangements 28 and 30. The first piston arrangement 28 comprises in addition to the first pressure piston 20 a first back-up piston 32. The second piston arrangement 30 also comprises in addition to the second pressure piston 24 a second back-up piston 34. The two back-up pistons 32 and 34 are guided in a linearly displaceable and sealing manner in guide bushes 36 and 38 inserted separately into the housing part 14. The guide bushes 36 and 38 are fixed in the housing 12.

From FIG. 1 it is also evident that the housing 12 in the region of the guide bushes 36 and 38 is provided with a flange region 40, in which the first housing part 14 is screw-connected to a second housing part 42. For positioning the first housing part 14 and the second housing part 42 correctly relative to one another a positioning sleeve 44 is provided. This is used simultaneously—as already indicated above—to fix the guide bushes 36 and 38 in the housing 12. Besides the guide property, the guide bushes 36 and 38 further have the function of bracing the back-up pistons 32 and 34 in FIG. 1 to the right in the illustrated position. For this purpose, the back-up pistons 32 and 34 are provided with a support projection 46 and 48 respectively. The piston arrangements 28 and 30 therefore occupy the predetermined normal position shown in FIG. 1 because the back-up pistons 32 and 34 are supported via the support projections 46 and 48 against the guide bushes 36 and 38 and the pressure pistons 20 and 24 are pressed by means of the resetting springs 22 and 26 against the back-up pistons 32 and 34. It should however be mentioned and will explained in detail below with reference to FIGS. 3 and 6 that there is formed in each case between the pressure pistons 20 and 24 and the back-up pistons 32 and 34 associated therewith a servo pressure chamber 47 and 49, which is chargeable with pressure fluid through a fluid connection 50.

In the second housing part 42 a transmission element 52 is received so as to be displaceable along a housing longitudinal axis C. The transmission element 52 is braced in FIG. 1 to the right against a diameter step 54 of the second housing part 42 and is movable in FIG. 2 to the left. It further comprises a circular-cylindrical receiving opening 56, into which a contact plunger 58 is introduced in a displaceable manner. However, before the contact plunger 58 in the course of a relative displacement along the housing longitudinal axis C may come into force-transmitting abutment with a base of the receiving opening 56, the contact plunger 58 has to overcome a play s. The contact plunger 58 is further guided displaceably in a guide collar 60 of the second housing part 42. At its, in FIG. 1, right end the contact plunger 58 is connected in a fixed manner to a force input piston 62, which in turn at its, in FIG. 1, right end receives a force input element 64 connected to a brake pedal. The force input piston 62 is biased by a resetting spring 66 into its normal position shown in FIG. 1, in which it holds the contact plunger 58 at the distance s from the base of the receiving opening 56. It should further be mentioned that the force input piston 62 is guided in a linearly movable manner in the second housing part 42.

The force input piston 62 with the second housing part 42, in particular including the guide collar 60, encloses a pedal-counterforce pressure chamber 68, which is formed inside a receiving bore 66 and is fluidically connectable by a non-illustrated fluid connection to a pedal-counterforce simulation device. About this too, more details are provided below.

The master cylinder arrangement 10 may be connected by a fastening flange 70 and fastening bolts 72 to a vehicle chassis.

For determining the position of the force input piston 62 a movable component 74 of a position sensor is fitted on the force input piston 62 and in the event of a brake pedal actuation moves together with the force input piston 62 along the housing longitudinal axis C. A stationary component 76 of the position sensor is moreover provided on the housing.

Before going on to describe the mode of operation of the master cylinder arrangement according to FIG. 1 with additional reference to FIG. 2, the integration of the master cylinder arrangement 10 according to FIG. 1 in the vehicle brake system shown diagrammatically in FIG. 3 will first be discussed.

Figure 3:
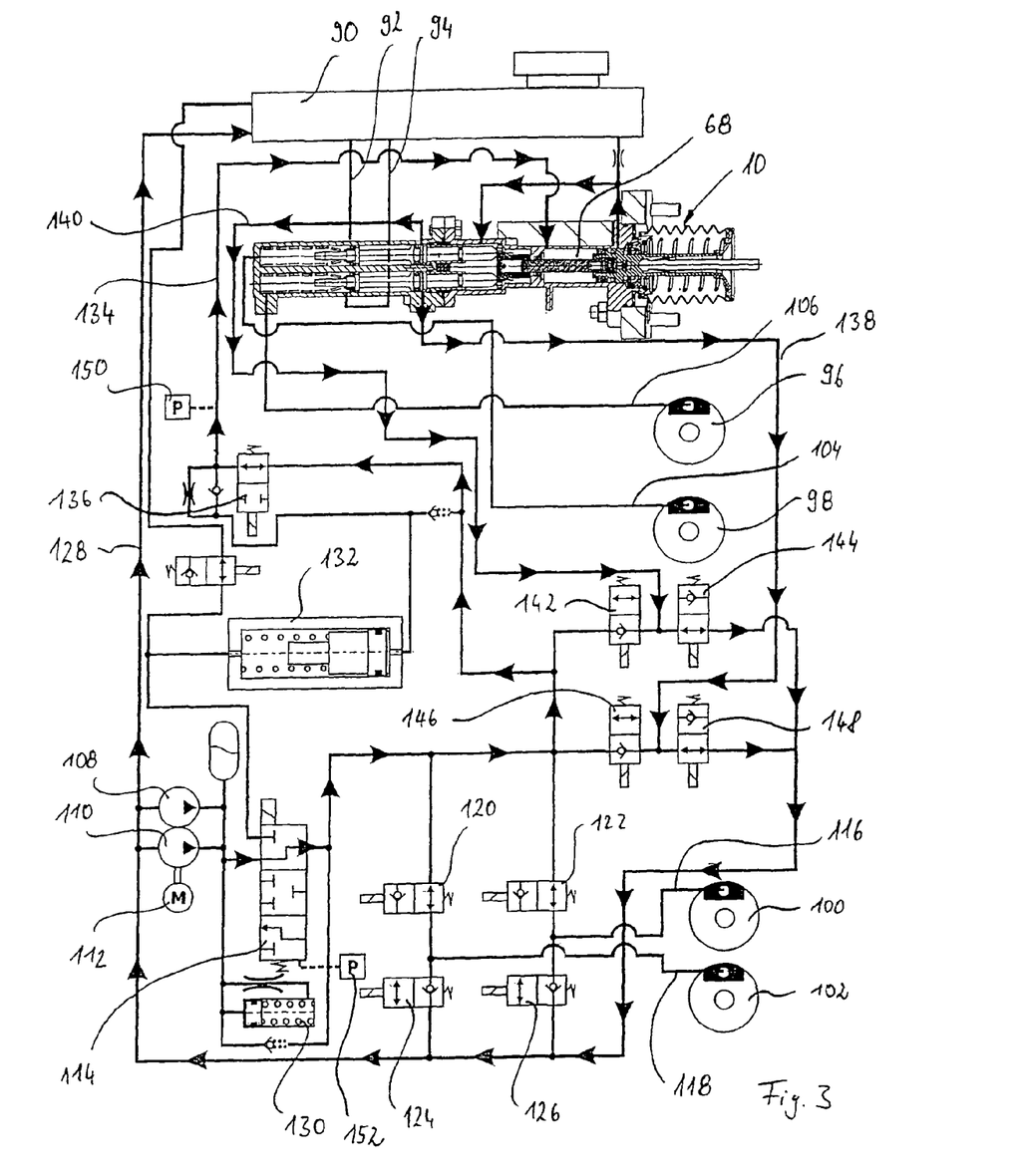
FIG. 3 is an overview representation of a motor vehicle brake system according to the invention.

FIG. 3 shows the master cylinder arrangement 10 according to the invention in a reduced representation. It is evident that the master cylinder arrangement 10 are fluidically connected by lines 92 and 94 to a fluid reservoir 90, wherein the lines 92 and 94 in the non-actuated position shown in FIG. 1 establish a fluidic connection to a first pressure chamber 78 and a second pressure chamber 80. However, as soon as the pressure pistons 20 and 24 are displaced in FIG. 1 to the left, this fluidic connection is automatically closed.

FIG. 3 further shows wheel brake units 96, 98, 100 and 102. The wheel brake unit 96 is fluidically connected by a fluid line 106 to the second pressure chamber 80, while the wheel brake unit 98 is fluidically connected by a fluid line 104 to the first pressure chamber 78. The two wheel brake units 100 and 102 are not directly charged with pressure fluid from the pressure chambers 78 and 80.

Rather, the wheel brake units 100 and 102 are charged via a main control valve 114 and feed lines 116 and 118 with hydraulic fluid from a pressure source, which is formed by pumps 108 and 110 and a motorized drive 112 associated therewith. For carrying hydraulic fluid to and from the wheel brake units 100 and 102 control valves 120, 122, 124 and 126 are further provided, wherein the control valves 124 and 126 allow hydraulic fluid to be removed from the wheel brake units 100 and 102 through the fluid line 128 and into the fluid reservoir 90. An accumulator 130 is moreover provided for compensating pressure variations.

FIG. 3 further shows a pedal-counterforce simulation device 132, which by means of a fluid line 134 and a fluid valve 136 disposed therein is connectable to and disconnectable from the pedal-counterforce pressure chamber 68.

It is further evident that the already previously mentioned servo pressure chambers 47 and 49 between the back-up pistons 32 and 34 and the pressure pistons 20 and 24 (see FIG. 1) is connectable by the fluid lines 138 and 140 and associated control valves 142, 144 as well as 146 and 148 to the main control valve 114 and, via this, ultimately to the pressure source comprising the pumps 108 and 110 in order to activate the servo pressure chambers 47 and 49 and hence displace the pressure pistons 20 and 24.

It is further evident from FIG. 3 that the vehicle brake system additionally comprises pressure sensors 150 and 152. The pressure sensor 150 is used to measure the fluid pressure in the hydraulic circuit of the pedal-counterforce simulation arrangement. The pressure sensor 152 on the other hand is used to measure the hydraulic pressure, with which the servo pressure chambers 47 and 49 as well as the wheel brake units 100 and 102 are charged.

It should further be mentioned that the individual arrows, with which the hydraulic lines in FIG. 3 are provided, represent the directions of flow for the situation of a filling of the system with hydraulic fluid. In operating situations different directions of flow of the pressure fluid arise.

There now follows a detailed description of the mode of operation of the vehicle brake system according to the invention and of the master cylinder arrangement according to the invention. Upon an actuation of the brake pedal, the force input element 64 is displaced in FIG. 1 to the left along the housing longitudinal axis C. With it, the force input piston 62 is displaced to the left, with the result that the pedal-counterforce pressure chamber 68 is reduced in volume. The pedal-counterforce simulation device 132 counteracts in a corresponding manner. By means of the position sensor 74, 76 the movement of the force input piston 62 is detected and communicated in the form of a corresponding electronic signal to an electronic control unit (ECU) 300. This signal in accordance with the detected movement activates the pumps 108 and 110 by means of the motor 112, thereby leading to a pressure build-up that may be detected by means of the pressure sensor 152. In dependence upon the pedal actuation detected by the position sensor 74, 76 the correspondingly built-up hydraulic pressure is then fed both to the servo pressure chambers 47 and 49 between pressure pistons 20 and 24 and back-up pistons 32 and 34 as well as to the wheel brake units 100 and 102. As a result of the loading of the servo pressure chambers 47 and 49, the pressure pistons 20 and 24 are displaced in FIG. 1 to the left along the bore longitudinal axes A and B, so that in the pressure chambers 78 and 80 a corresponding hydraulic pressure is built up. This is transmitted via the fluid lines 104 and 106 to the wheel brake units 96 and 98 so that these, in addition to the wheel brake units 100 and 102, decelerate the vehicle.

In an emergency operating situation, in which a hydraulic supply of the servo chambers 47 and 49 or/and of the wheel brake units 100 and 102 does not occur, for example because of a failure of the motor 112, a corresponding servo-pressure-actuated displacement of the pressure pistons 20 and 24 does not occur either. This means that upon a brake pedal actuation the contact plunger 58 penetrates deeper and deeper into the receiving opening 56, with simultaneous reduction of the play s, until the contact plunger 58 finally abuts the base of the receiving opening 56. There is then a direct mechanical connection between the transmission element 52 and the brake pedal by means of the force input element 64, the force input piston 62 and the contact plunger 58. Any further depression of the brake pedal is then transmitted by the transmission element 52 in an identical manner to the two back-up pistons 32 and 34, so that these are displaced in FIG. 1 to the left along the bore longitudinal axes A and B. The state of the direct mechanical connection of the contact plunger 58 and the transmission element 52 may be seen in FIG. 2. FIG. 2 also shows how the transmission element 52 has already been lifted by a distance d off the diameter step 54 and displaced in FIG. 2 to the left. With the back-up pistons 32 and 34 the pressure pistons 20 and 24 have also been displaced to the left counter to the action of the resetting springs 22 and 26, so that in the pressure chambers 78 and 80 hydraulic pressure has been built up. FIG. 2 also shows the possibility of a direct mechanical actuation of the master cylinder arrangement 10 in the event of a failure of the hydraulic supply of the servo pressure chambers 47 and 49. In order to make such a direct mechanical actuation as resistance-free as possible, the pedal-counterforce pressure chamber 68 is fluidically disconnected from the pedal-counterforce simulation device 132 and connected to the fluid reservoir 90, with the result that no pedal counterforce is generated.

Figure 2:
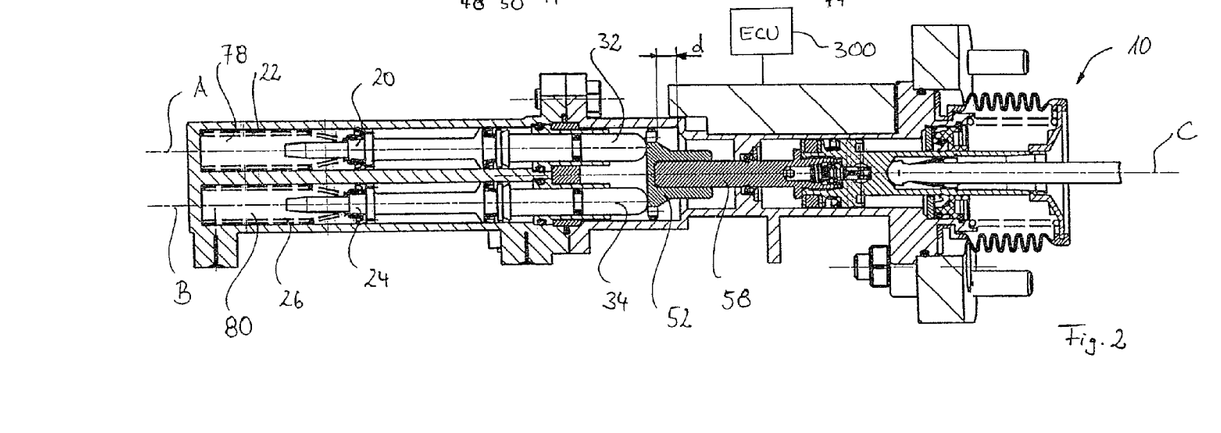
FIG. 2 is a view as in FIG. 1 in emergency operation position.

FIGS. 4 to 9 show a second form of construction that is modified compared to the form of construction according to FIGS. 1 and 2. To avoid repetition, for components of an identical type or of an identical effect the same reference characters as with reference to FIGS. 1 and 2 are used, only with the lower case letter "a" as a suffix. The form of construction according to FIGS. 4 to 9 differs from the form of construction according to FIGS. 1 and 2 only in that the transmission element 52a is provided at its two ends with hollow spaces 156a, 158a, which are separated from one another by a dividing wall 160a. The transmission element 52a further has on its outer periphery in each case two guide regions 162a and 164a, by means of which it is guided in a linearly displaceable manner on the cylindrical inner surface of the second housing part 42a. By means of the two guide regions 162a and 164a transverse forces arising at the transmission element 52a may be transmitted in a bind-free manner to the second housing part 42a.

Figure 5:
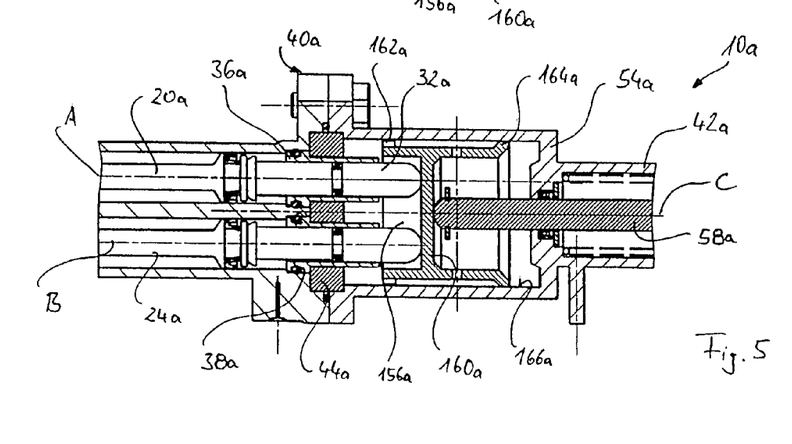
FIG. 5 is a view as in FIG. 4 in emergency operation position.

FIG. 5 illustrates the state that is adopted in an emergency situation, namely when the play s is used up and the contact plunger 58a abuts the dividing wall 160a for the direct mechanical transmission of force to the transmission element 52a. It is precisely in such a situation that the two guide regions 162a and 164a have an advantageous effect because they allow a low-friction and in particular bind-free displacement of the transmission element 52a in the second housing part 42a along the cylindrical inner surface 166a.

Figure 4:
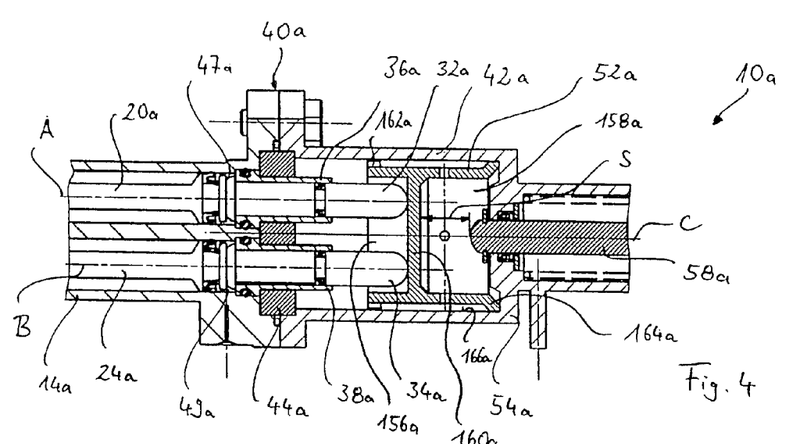
FIG. 4 is a detail view of a second form of construction of the invention in non-actuated position.
Figure 6:
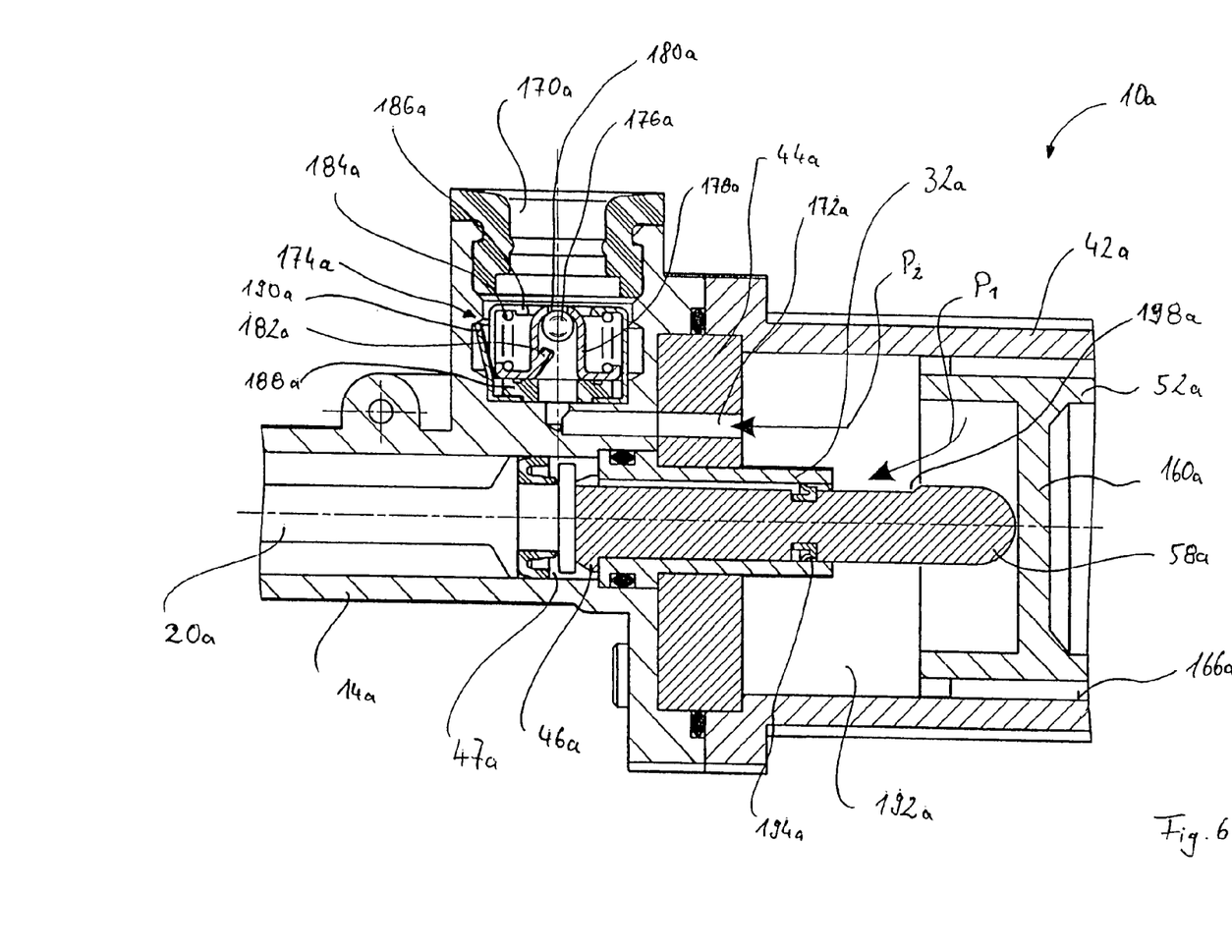
FIG. 6 is an enlarged detail view of the second form of construction to illustrate filling of the system in a different sectional plane from FIGS. 4 and 5.

FIG. 6 reveals a further aspect of the present invention by way of the embodiment shown in FIGS. 4 to 6. It is evident that in the first housing part 14a a connection 170a to the fluid reservoir 90 (FIG. 3) is provided. In order, when the entire system is filled for the first time or after a maintenance operation, to be able to guarantee that all of the functionally relevant regions, in particular all of the fluid chambers, are filled with fluid before the fluid flows off through a discharge channel 172a into the fluid reservoir 90 (see FIG. 3), the invention further provides the fill-assist valve 174a shown in FIG. 6. This comprises a spherical stopper 176a, which is received in an inner cage 178a and may close a valve opening 180a. As a protection against loss, a retaining lug 182a is provided. The inner cage 178a is biased into the position shown in FIG. 6 by means of a compression spring 184a. The compression spring 184a is supported by its, in FIG. 6, upper end against an outer cage 186a, which is provided with radial slots. Between the outer cage 186a and the inner cage 178a a disk-shaped sealing element 188a is provided. This provides a sealing connection between the outer cage 186a and the inner cage 178a in the biased position shown in FIG. 6. A detent spring 190a is further provided, which holds the fill-assist valve 174a fast in the first housing 14a.

The fill-assist valve 174a in dependence upon the bias of the spring 184a has the effect that, in the event of an excess pressure inside the chamber 192a during filling compared to the atmospheric pressure prevailing in the fluid reservoir 90 (see FIG. 3), there is initially no fluidic connection between the chamber 192a and the fluid reservoir. This is because the excess pressure causes the spherical stopper 176a to be pressed sealingly against the valve opening 180a and the spring bias of the spring 184a causes the inner valve cage 178a to be pressed sealingly against the sealing element 188a. The pressure in the chamber 192a does admittedly ensure that hydraulic fluid flows in accordance with arrow $P_1$ past the sealing element 194a into the servo chamber 47a (and the servo chamber 49a not shown in FIG. 6) and fills these. However, because of the closing effect of the fill-assist valve 174a there is initially no flow of fluid into the fluid reservoir 90. However, as soon as the excess pressure in the fluid chamber 192a rises further, for example to a pressure above the conventional filling pressure of 7 bar, the prevailing pressure causes the inner cage 178a to be pressed upwards in FIG. 6 counter to the action of the compression spring 184a. As a result, hydraulic fluid may flow in accordance with arrow $P_2$ through the radial slots in the outer cage 186a into the fluid reservoir 90a. The entire hydraulic system may according to the invention be tuned in such a way that prior to attainment of the maximum filling pressure, at which the fill-assist valve 174a opens for the first time, all of the chambers to be filled in the master cylinder arrangement and in the brake system shown in FIG. 3 are filled.

It should additionally be pointed out that for the purpose of filling there may be provided in the back-up piston 58a a groove or/and a recess 198a, which may extend right up to the, in FIG. 6, left axial end of the back-up piston 58a.

Figure 7:
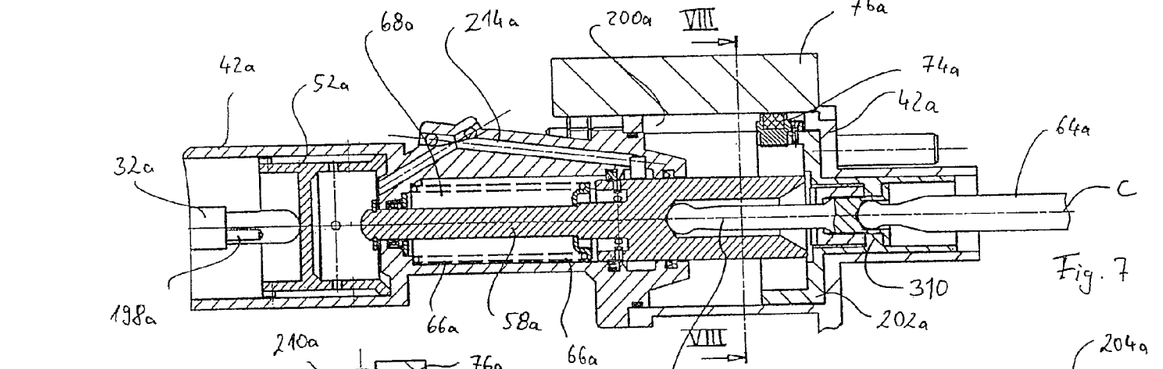
FIG. 7 is a sectional representation of the second form of construction according to FIGS. 4 to 6 to illustrate the actuation sensing.
Figure 8:
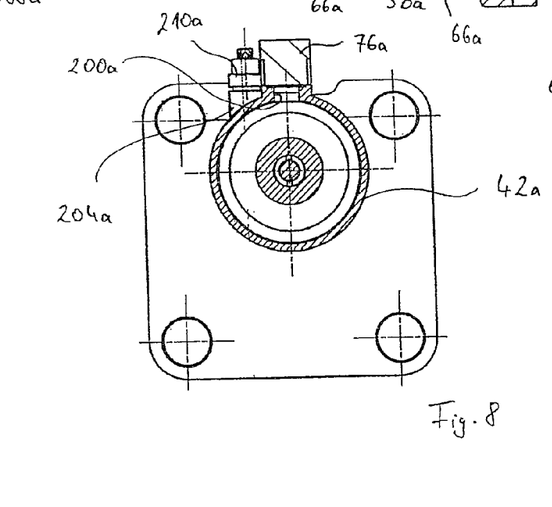
FIG. 8 is a sectional representation along the cutting line VIII-VIII of FIG. 7.
Figure 9:
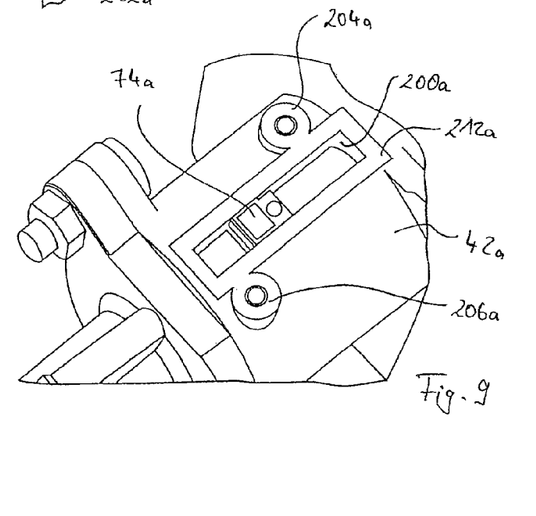
FIG. 9 is a perspective partial view of the region shown in FIGS. 7 and 8 with the housing open.

FIGS. 7 to 9 show the second embodiment in the region around the force input piston 62a. It is evident that the force input piston 62a is additionally provided with an axial journal, which is received in a corresponding receiver of the contact plunger 58a. What is particularly evident in FIGS. 7 to 9, however, is the design of the position sensor comprising the two components 74a and 76a.

The stationary component 76a of the position sensor is screw-fastened directly onto the second housing part 42a, wherein the second housing part 42a has an upwardly open well 200a. In this well 200a the movable component 74a of the position sensor is guided. More precisely, the movable component 74a of the position sensor, for example a permanent magnet, is fitted on the radially outer region 202a of the force input piston 62a and projects into the well 200a. In this case, the force input piston 62a is provided with a carrier piston 310 (see FIG. 7) forming the radially outer region 202a and being movable with the force input piston 62a. Also evident from FIG. 9 are two fastening eyes 204a and 206a, onto which, as is shown by way of example in FIG. 8 at reference character 210a, corresponding fastening eyes are mountable and screw-fastenable. The stationary component 76a of the sensor element is therefore pressed firmly and in a fluidproof manner onto a frame-like sealing surface 212a (see FIG. 9) on the housing part 42 and applied sealingly against this sealing surface.

By virtue of the design and arrangement of the position sensor shown in FIGS. 7 to 9 it is possible, by removing the stationary component 76a of the position sensor, to gain access to the moving component 74a of the motion sensor and exchange it, where necessary, in particular for maintenance purposes, without having to dismantle the entire system.

FIG. 7 further reveals at the reference character 214a a connection channel that is used to fill the pedal-counterforce pressure chamber 68a. A further characteristic feature of the form of construction according to FIGS. 7 to 9 is that the resetting spring 66a is disposed inside the first housing part 42a.

Finally, it should additionally be pointed out that the groove 198a mentioned with reference to FIG. 6 may be seen from a different perspective in FIG. 7.

Although the previously described features have been described in connection with the present invention, in particular in connection with the use of the transmission element 52 and 52a, it should be stated that these features may be used also in other types of master cylinder arrangement, i.e. independently of whether such a transmission element 52, 52a is provided or not. This applies in particular to the features regarding the multipart design of the housing 12, the provision of a positioning sleeve 44, 44a, and the use of guide bushes 36, 38 and/or 36a, 38a and moreover regarding the arrangement of the position sensor, in particular of the components 74 and 76 as well as 74a and 76a.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Master cylinder arrangement for a motor vehicle hydraulic brake system comprising:
   a housing in which two adjacent cylinder bores are provided,
   two piston arrangements, wherein a first piston arrangement is received in a first of the cylinder bores so as to be displaceable along a first bore longitudinal axis, and wherein a second piston arrangement is received in a second of the cylinder bores so as to be displaceable along a second bore longitudinal axis,
   a force input piston which is connectable or is connected to a brake pedal, wherein in accordance with a movement of the force input piston, the first piston arrangement and the second piston arrangement are displaceable,
   wherein the first piston arrangement with the housing delimits a first pressure chamber which is fluidically connected to a hydraulic brake system, and wherein the second piston arrangement with the housing delimits a second pressure chamber which is fluidically connected to the hydraulic brake system, and
   wherein between the first piston arrangement as well as the second piston arrangement and the force input piston, a separate transmission element is disposed which is movable into joint abutment with the first piston arrangement and the second piston arrangement,
   wherein in a normal operating situation, the force input piston is disconnected in terms of force from the first piston arrangement and the second piston arrangement; and
   wherein in an emergency operating situation, the force input piston is connected in terms of force with the first piston arrangement and the second piston arrangement.

2. Master cylinder arrangement according to claim 1, wherein the adjacent cylinder bores extend substantially parallel to one another.

3. Master cylinder arrangement according to claim 1, wherein the first and second piston arrangement are biased into a normal position in the direction of the transmission element in each case by means of piston-resetting springs.

4. Master cylinder arrangement according to claim 1, wherein the force input piston is biased into a normal position by means of a pedal-resetting spring.

5. Master cylinder arrangement according to claim 1, wherein each piston arrangement comprises a pressure piston and a back-up piston, wherein disposed between the respective pressure piston and the respective back-up piston is a servo chamber, which is chargeable with a pressure fluid from a pressure source.

6. Master cylinder arrangement according to claim 5, wherein the servo chambers, which are associated with the first piston arrangement and the second piston arrangement, are jointly chargeable with pressure fluid for the brake-active increase of the fluid pressure in the first pressure chamber and in the second pressure chamber.

7. Master cylinder arrangement according to claim 1, wherein the force input piston is received displaceably in a cylindrical receiving bore and with the housing encloses a pedal-counterforce pressure chamber.

8. Master cylinder arrangement according to claim 7, wherein the pedal-counterforce pressure chamber is connectable to a hydraulic pedal-counterforce simulation device.

9. Master cylinder arrangement according to claim 8, wherein the force input piston is connected to a contact plunger, which is received in a cylindrical connection bore aligned with the receiving bore and, as a result of a displacement of the force input piston, after overcoming a play is mechanically connectable to the transmission element.

10. Master cylinder arrangement according to claim 9, wherein the transmission element comprises a central receiving opening, which receives the contact plunger with the play.

11. Master cylinder arrangement according to claim 9, wherein the play is dimensioned in such a way that a pedal actuation for regenerative braking in a hybrid vehicle occurs without a mechanical connection of force input piston and first as well as second piston arrangement.

12. Master cylinder arrangement according to claim 1, wherein the transmission element at its end facing the piston arrangements is cup-shaped, and wherein the cup-shaped end of the transmission element receives a portion of the piston arrangements that faces towards it.

13. Master cylinder arrangement according to claim 12, wherein the transmission element is guided by means of at least two peripheral regions in a linearly movable, tilt-proof manner in the housing.

14. Master cylinder arrangement according to claim 1, wherein the housing is of a multipart design, wherein individual housing parts in the region of the piston arrangements are connected in a fluidproof, detachable manner to one another.

15. Master cylinder arrangement according to claim 14, wherein housing parts that are to be connected to one another, given a mutual connection, are positioned relative to one another in each case by means of a positioning element.

16. Master cylinder arrangement according to claim 1, wherein the piston arrangements are at least partially guided in guide bushes inserted into the housing.

17. Master cylinder arrangement according to claim 16, wherein the guide bushes are manufactured from corrosion-resistant and friction-reducing material.

18. Master cylinder arrangement according to claim 1, wherein a movable component of a motion sensor is connected to the force input piston and that an immovable component of the motion sensor is provided on the housing.

19. Master cylinder arrangement according to claim 18, wherein the movable component of the motion sensor is displaceably guided in the housing on a carrier piston that is movable with the force input piston.

20. Master cylinder arrangement according to claim 19, wherein the movable component of the motion sensor is movably received close to or in an externally accessible guide well formed in the housing, wherein the guide well is sealingly closable by means of the immovable component of the motion sensor or by means of a structural part that receives the immovable component.

21. Master cylinder arrangement according to claim 20, characterized in that shut-off valve, which opens pressure-dependently towards a fluid reservoir, is provided in the housing for filling a servo chamber or pressure chamber with hydraulic fluid.

22. Motor vehicle brake system comprising
   a master cylinder arrangement according to claim 1,
   a pressure source,
   hydraulically activatable wheel brake units associated with individual wheels, and
   an electronic control unit,
   wherein the pressure source is fluidically connectable to the wheel brake units and to the master cylinder arrangement in such a way that the pressure fluid supplied from the pressure source is usable on the one hand to charge the master cylinder arrangement and on the other hand to activate at least two wheel brake units.

23. Motor vehicle brake system according to claim 22, wherein the pressure source comprises a pump arrangement and an accumulator.

24. Motor vehicle brake system according to claim 22, characterized by a hydraulic pedal-counterforce simulation device, which is fluidically connected to the pedal-counterforce pressure chamber.

25. Motor vehicle brake system according to claim 24, wherein the pedal-counterforce simulation device is disconnectable from the pedal-counterforce pressure chamber by means of a simulation-device on-off valve.

26. Motor vehicle brake system according to claim 22, wherein a generator that is usable to decelerate the vehicle is provided and that the vehicle deceleration achieved upon activation of the generator is taken into consideration when activating the motor vehicle brake system.

\* \* \* \* \*